Oct. 1, 1940. J. ROBERTS Re. 21,591
ICE TRAY
Original Filed Dec. 9, 1933
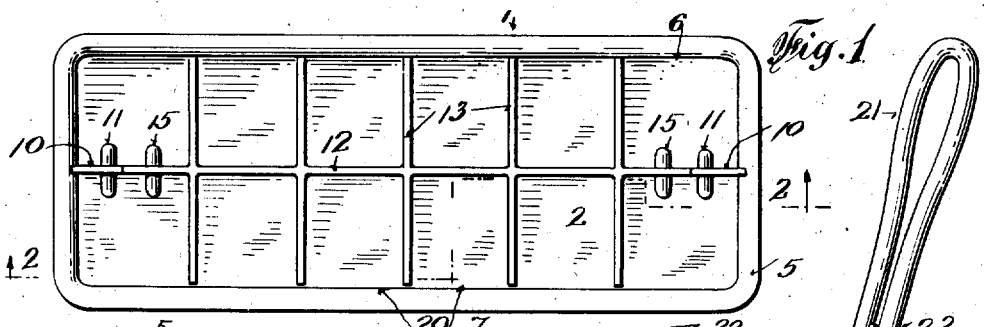
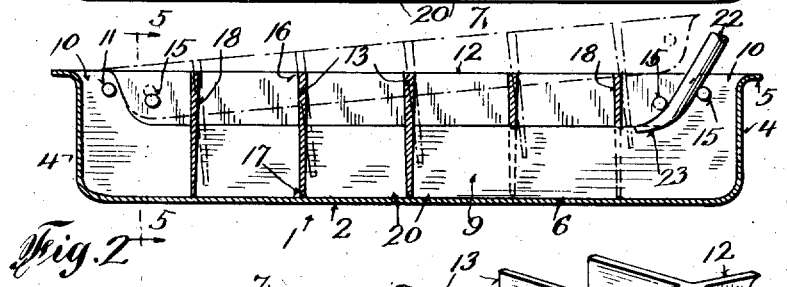
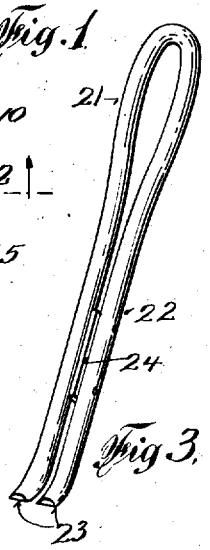
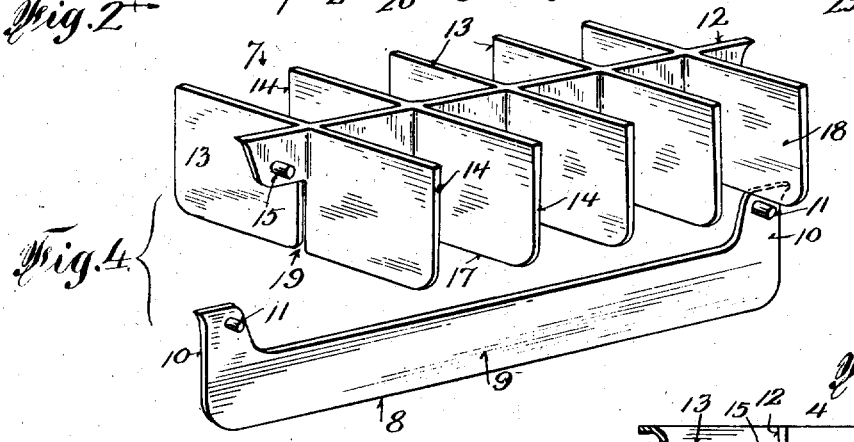
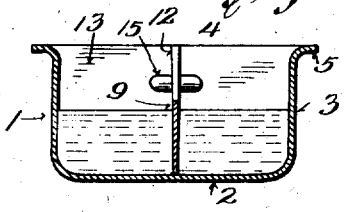
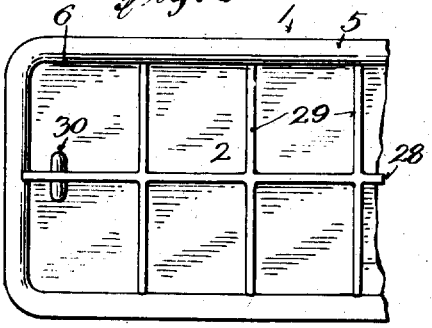
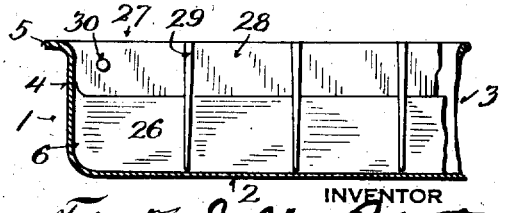
INVENTOR
Julius Roberts
BY
Charles E. Hensley
ATTORNEY Reissued Oct. 1, 1940

Re. 21,591

UNITED STATES PATENT OFFICE 21,591

ICE TRAY

Julius Roberts, Brooklyn, N. Y.

Original No. 2,045,371, dated June 23, 1936, Serial No. 701,602, December 9, 1933. Application for reissue May 25, 1938, Serial No. 210,035

29 Claims. (Cl. 62—108.5)

My invention relates to means for releasing ice cubes from a grid. In household refrigerators of the type operated by electrical or gas means for keeping the refrigerator cold, as distinguished from the ordinary ice box which is cooled by ice supplied thereto, it is common practice to provide one or more receptacles called trays, which are placed within the absorption coil for the purpose of freezing water or other liquids in the tray into ice cubes for various uses. It has been customary to divide off the interior of the tray by means of a device commonly called a grid, in order to form a number of cubes in one tray to provide cubes of convenient sizes. It has proven to be a difficult problem to free the frozen cubes from the tray and grid and though the problem would appear to be a simple one, nevertheless until the present invention the problem has not been successfully met.

One plan has been to make the tray or the grid or both of flexible material, such as rubber or rubber composition, so that after the cubes have been frozen in the tray, the tray or grid or both could be flexed or bent to release the cubes. While this is not entirely successful as far as easily releasing the cubes is concerned, and aside from the fact that the cubes are apt to fall on the floor during the releasing operation, the most serious disadvantage of this method is that the rubber or rubber composition is an efficient insulator and therefore it prevents the absorption coil from rapidly absorbing the heat from the liquid in the tray and therefore the cubes cannot be formed nearly as rapidly as in a metal tray having a metal grid.

Where metal trays and grid have been used it has been the practice to apply some degree of heat, such as by pouring water, generally warm or hot, over the inverted tray to soften the cubes where they adhere to the tray and grid so that the cubes may be released. This is obviously an unhandy and unsatisfactory method.

The object of my present invention is to provide a tray and grid which may be made of material which will not prevent the rapid absorption of heat like the rubber trays and grids referred to above, so that the cubes may be rapidly frozen. Preferably, the tray and the grid are made of metal. The broad feature of my invention resides in making the grid, whatever its shape and its construction may be, in parts which may be separated or moved in relation to each other in order to break the adhesion of the cubes to the tray or grid, or both, and thus release the cubes. This operation may be accomplished completely without subjecting the tray or grid to the action of water or other partial warming as above set forth, as there is no partial melting of the cubes required to release them.

The release of the cubes under the present invention is very rapid and requires very little effort. One of the broad features of my invention is the fact that the relatively movable sections of the grid can be moved to release the cubes by simple means operating on the broad principle of leverage in order that the force necessary to overcome the adhesion and pressure of the cubes may be conveniently applied.

As has been stated above, the grid is made of at least two parts which are relatively movable and they are preferably completely separable from each other.

The grid may be completely detachable from the tray, as it is in the preferred form, in order that the interior of the tray may become entirely unobstructed so that it may be used for other purposes such as for making ice cream therein. Or, one section of the grid may be attached to the tray, whereas another section is removable. I have shown in the drawing of this application both forms of the invention.

The relatively movable sections of the grid have surfaces in contact with the liquid in the tray and with the cubes when frozen and it is by a relative movement of the sections of the grid that the adhesion of the cubes is overcome to release the cubes.

Another object of my invention is to provide a grid of relatively movable sections having fins, which are tapered in thickness with the thickermost portions at the top and the thinner portions at the lower part, so that the opposed surfaces of the fins will not be parallel. This assists in releasing the cubes from the grid when one section is lifted in relation to the other.

Other objects and advantages will be set forth in the following detailed description of my invention.

In the drawing forming part of this application,

Figure 1 is a plan view of an ice cube tray having the improved grid in place for operation, Figure 2 is a sectional view taken on the line 2—2 of Figure 1, Figure 3 is a perspective view of a tool for separating the grid sections, Figure 4 is a perspective view of the grid sections separated, in one form of the invention, Figure 5 is a cross sectional view of the tray and grid, Figure 6 is a plan view of part of a tray and grid and showing my invention in a modified form, and Figure 7 is a longitudinal sectional view thereof.

The improved grid may be applied to any type of receptacle in which ice cubes are to be frozen and in the drawing I have shown the ordinary form of cube tray generally used in refrigerators and which is placed inside the absorption coil of the refrigerator. In the drawing the tray 1 is shown as consisting of a bottom wall 2, and side and end walls 3, 4, the latter having their upper ends turned or rolled at 5. In the form of the invention shown in Figures 1 to 5, which I will first describe, the tray has one large compartment 6 to hold the liquid which is to be frozen. The purpose of the grid is to divide this compartment off into a number of smaller compartments so that instead of forming one large body of ice there will be formed a number of smaller bodies called cubes. This term "cubes" is used in the broad sense to include pieces of any shape, whether cubical, oval or any other shape.

The grid forming the subject of this invention is composed of relatively movable, preferably separable sections, each of which has surfaces in contact with the liquid and in contact with the cubes when frozen. I will describe the preferred form of grid in detail but with the intention of covering all forms which come within the scope of the appended claims.

In the form of the grid shown in Figures 1 to 5 inclusive there are two separable sections, both of which may be lifted out of the tray to leave the latter unobstructed to permit it to be used, when desired, for other purposes, such as for freezing ice cream therein.

As shown in the drawing there is an upper section 7 and a lower section 8.

The latter is shown as a plate or strip of metal having a longitudinal section 9 the lower edge of which may rest on the upper surface of the bottom wall 2 of the tray for the purpose of dividing off the lower portion of the compartment 6 longitudinally. The lower member is shown extending upwardly at the ends 10 and these end extensions are shown as provided with laterally extending pins 11 for a purpose which will be explained hereinafter. In the form of the invention shown in Figures 1 to 5, this lower grid member rests against the bottom and the end walls of the tray and it is removable from the tray.

The upper or second grid section 7 comprises in part the longitudinal member 12 which also extends lengthwise of the tray; and when the parts are assembled as when the cubes are being frozen, the member 12 lies in the same vertical plane as the member 9 and is contiguous therewith. Along the member 12 are a number of fins 13, the number and spacing of which depends upon the size of the cubes to be made. These fins are shown as disposed at right angles to the longitudinal member 12 and projecting from opposite sides thereof. These fins may be made integral with the longitudinal member 12 or they may be welded, or soldered, or otherwise attached thereto, as desired.

The fins extend laterally from the longitudinal member 12 and their free ends 14 extend far enough to lie in contact with or near the inner surfaces of the side walls of the tray. The longitudinal member 12 is shown as provided with laterally extending pins 15 disposed near the pins 11 when the grid is assembled. I prefer to make the several fins of tapered thickness, as shown in Figure 2. That is, the fins are thicker at their top edges 16 and gradually decrease in thickness to their bottom edges 17, so that when the upper grid section is raised the surfaces of the fins will be released from the corresponding surfaces of the cubes more readily than if the fins were not tapered.

The endmost fins are shown as having only one surface, i. e., the inner surface 18, tapered, whereas the outer surfaces are shown as perpendicular. The several fins are shown as provided with vertical slots 19 extending upwardly from their bottom edges to the bottom line of the longitudinal member 12. These slots permit the lower grid member 8 to extend upwardly in the fins so that when the grid is assembled the lower member 8 will lie contiguous to the longitudinal member 12 and the two will form a complete longitudinal dividing wall for the tray.

From the above it will be apparent that when the grid sections are assembled and placed in the tray they divide off the interior of the tray into a number of individual cube compartments 20, there being two rows of such compartments shown in Figure 1, on opposite sides of the members 8 and 12.

In Figure 3 I have shown a convenient tool which may be used for separating the sections of the grid after the cubes have been frozen. The tool is shown as made of a rod bent into U shape to form the handle 21 to be gripped in the hand; and of the parallel shanks 22, terminating in the prying tips 23 which are shown as bent slightly from the line of the shanks. I have shown a filling piece 24 riveted between the shanks 22 to hold these properly spaced so that the shanks may straddle the longitudinal member 12 and the extensions 10.

*Operation*

The operation of this form of my invention will be as follows:

The grid may be assembled by inserting the member 8 so that the part 9 thereof extends upwardly into the several slots 19 of the fins, with the upper edge of the member 9 resting against the bottom edge of the member 12. The grid, as thus assembled, may be inserted into the tray so that the members 9 and 12 form a longitudinal dividing wall lying in a vertical plane within the tray and the several fins 13 form lateral partitions dividing the compartment 6 of the tray into a plurality of smaller compartments the size of the individual cubes which are to be frozen. The liquid, whether water or other material, which is to be frozen into the cubes, may be placed in the tray before or after the grid has been placed therein and the liquid may be of any depth, preferably about the level of the lower edge of the member 12 or slightly above the same. A cover may be applied to the tray or not, as desired.

The tray may be inserted into the rack inside the absorption coil of the refrigerator (not shown) in order that the heat of the body of liquid may be absorbed by the absorption coil for the purpose of freezing the liquid in the tray into a solid. Where the tray and grid are made of metal, heat may be rapidly extracted from the liquid so that it is very rapidly frozen, whereas when the grid or tray or both are made of rubber or rubber composition the time required for freezing the cubes is considerably greater than with the present device.

The tray and grid will be allowed to stand in the absorption coil rack until the liquid in the tray has been reduced to a frozen condition, or until individual cubes have formed in the several compartments. When the cubes have been sufficiently formed, the tray will be removed from the refrigerator and the operator will proceed to release the cubes by a relative movement of the sections of the grid.

A tool such as that shown in Figure 3 is applied to the grid by having the lower ends of the shanks 22 straddle the members 10 and 12 of the grid, as shown at the right in Figure 2. In this position the backs of the shanks 22 will rest against the pins 11 on the lower section of the grid and the forward surfaces will rest under the pins 15 which are attached to the grid member 12. If only one end of the grid is to be lifted at a time, one such tool may be applied, as shown in Figure 2, but it is preferable to use a second tool like that shown in Figure 3, and to apply it to the left hand end of the grid in Figure 2 in the same manner as the tool is applied to the right hand in this figure. In other words, a tool will be manipulated in each hand so that at both ends the grid will be acted upon by these lever members.

The handle portions of the tool or tools will be pressed downwardly when engaged with the grid, as shown in Figure 2, and the tendency of the tool will be to press downwardly on the pins 11 while the ends 23 pry upwardly on the pins 15 and the leverage is such that considerable force may be applied to separate the grid members. This action will serve to force the grid section 7 upwardly and away from the lower grid section 8 and the tray, and it will overcome the adhesion of the several cubes to the grid and to the tray. Preferably the section 7 of the grid is entirely removed from the tray and when this has been done the several cubes will remain in the tray and will be released from the grid and the walls of the tray. Occasionally one or more cubes will lift up with the grid section 7 but if merely tapped lightly it will fall from the grid section 7 back into the tray.

It will be noted that the surfaces of the cubes will be in contact with the side walls and bottom walls of the tray as well as with the side surfaces of the member 8 and with the opposite surfaces of the several fins 13.

If the water level is above the top edge of the member 8 the cubes will also be in contact with the member 12. The device is so designed that the portion of the grid which is first moved that is, the section 7, has a total area of contact with the cubes the same or nearly the same as the area of contact of the walls of the tray and the member 8 with the cubes. Therefore, if the member 7 is moved away from the member 8 and the walls of the tray, the adhesion between the cubes and the various walls described above will be overcome by the force applied to move the upper section of the grid in relation to the lower section and the tray and this action serves to separate the cubes from all of the surfaces with which they are in contact, and thereby release the cubes. After the upper section 7 has been moved in relation to the lower section 8 of the grid and the tray, it is preferably lifted entirely out of the tray and then the section 8 may also be lifted from the tray, leaving the detached cubes in the tray from which they may be individually removed or dumped out by inverting the tray, or disposed of in any other manner.

By employing a device acting on the lever principle for prying the sections of the grid apart, the force necessary may be conveniently applied by the operator. If two tools such as shown in Figure 3 are simultaneously applied at opposite ends of the grid, ample force may be applied to quickly separate the sections of the grid. By tapering the surfaces of the fins in the manner above described, there is a tendency for the fins to be released from adhesion to the corresponding surfaces of the cubes, so that the grid sections may be separated with the application of less force than if the surfaces of the fins were perpendicular and parallel. In order to make the adhesion of the cubes to the lower member 8 and the surfaces of the walls of the tray equal to or slightly greater than the adhesion to the upper section 7 of the grid, I have shown the member 9 tapered in thickness with the greater thickness at the top edge and the lesser thickness at the bottom edge of this member.

It will be noted that in the operation of the grid sections the lower member 8 remains in the tray while the grid sections are being separated. As the member 8 remains in the tray until the upper section is separated from it, the taper and thickness of the member 9 will have the effect of preventing the ice cubes from rising when the section 7 is lifted, in order to insure the breaking of the adhesion of the cubes to the section 7 of the grid, as the latter is lifted. While the tapering of the fins in the manner described above and the tapering of the member 9 is preferable, neither of these features is vital to the operation of my invention.

In the form of my invention shown in Figures 6 and 7 the grid is composed, in part, of a lower member 26 which in this construction is securely attached to the tray by means of soldering, welding or by being made integral with the tray, instead of being removable as is the member 8 in the previous construction. The member 26 therefore, forms a permanent longitudinal dividing wall within the tray. The top or movable grid section 27 is composed of the longitudinal member 28 which corresponds in function with the member 12 in the previously described form; and when in assembled position it rests on the upper edge of the member 26 and it stands in the same plane with the latter and is contiguous thereto. The fins 29 in this construction are mounted upon or formed integral with the longitudinal member 28 similar to the fins in the first construction; and preferably they are tapered in thickness in the same manner as the fins 13. In this form of the invention the longitudinal member 28 at each end is provided with the laterally extending pin 30. The fins 29 will be provided with vertical slots corresponding with the slots 19 in the previous form, so that the lower grid member 26 is received in these slots.

The operation of this device is very similar to the first described form. The upper grid section, consisting of the longitudinal member 28 and the fins 29, is placed in the tray so that the member 28 rests on the top edge of the member 26 and the lower portions of the fins straddle the latter member. The liquid is placed in the tray to fill the various cube compartments to any desired level, preferably to the top edge of the member 26 or slightly above the same. The tray will be inserted into the absorption coil of the refrigerator the same as in the first form of the device and will remain there until the liquid has been frozen, after which the tray will be removed from the refrigerator and the operator will proceed to release the cubes.

To do this the tool shown in Figure 3 may be placed so that the back of the tool rests against the top edge of the tray and the front of the member 23 engage under the projections 30. By pressing the handle portion of the lever downwardly, the members 23 will pry upwardly on the projections 30 and force the upper section of the grid away from the lower section and the tray. This action will release the cubes by overcoming their adhesion to the tray and to the several sections of the grid. When the upper section of the grid has been removed from the tray and from the lower section the cubes will remain in the tray although one or more may be lifted with the upper section of the grid, but such cubes can be readily detached by tapping them lightly. In this form of my invention I prefer to taper the fins of the grid the same as in the previous construction, but the lower grid member 26 is preferably not tapered in this form of the invention because this grid member remains attached to the tray and it might tend to lock the cubes within the lower grid member.

From the above it will be apparent that I have provided a grid for ice cube trays of such a character that the cubes may be automatically released upon the separation of the sections of the grid, thereby making the release of the cubes a very simple operation. It is not necessary to follow the particular form of grid which I have illustrated and described, as various changes may be made within the scope of the claims hereunto annexed.

Having described my invention, what I claim is:

1. A grid for ice cube trays comprising relatively movable sections, said sections each having a longitudinal dividing member, said dividing members adapted to lie in a common plane within the tray, said grid having lateral fins carried by one of said dividing members and being of such depth as to project over the longitudinal member of the other grid section to partition the interior of said tray, the sections of said grid being relatively movable to permit said longitudinal members to be at least partially separated.

2. A grid for ice cube trays, including a lower section adapted to form a longitudinal dividing member in a tray, an upper section including a longitudinal member adapted to lie in a common plane with said lower member, laterally extending fins connected to the longitudinal member of said upper grid section, said fins extending below the bottom of said upper longitudinal member and having slots extending upwardly from the bottom thereof to receive said bottom section therein, said grid sections being relatively movable to permit the cubes to be released therefrom.

3. A grid for ice cube trays including a lower section adapted to form a longitudinal, vertical dividing member in a tray, said member being tapered in thickness with the thicker portion at the top and the thinner portion at the bottom thereof, an upper section including a longitudinal member adapted to lie in a common plane with said lower member, laterally extending fins on the longitudinal member of said upper grid section, said fins extending below the bottom of said longitudinal member of the upper section and having slots extending upwardly from the bottom thereof to receive said bottom section therein, said grid sections being relatively movable to permit the cubes to be released therefrom.

4. A grid for ice cube trays, including a lower section comprising a vertical partitioning wall having upwardly extending ends provided with engaging members, an upper grid section having a longitudinal member cooperating with said vertical partitioning wall and having engaging members on the ends thereof, said grid having laterally extending fins, and a prying lever adapted to mutually react upon said engaging members on the grid sections to cause a relative movement of said grid sections.

5. The combination of an ice cube tray and a grid therefor, said grid including a lower section adapted to form a longitudinal dividing member in said tray, an upper section adapted to be moved upwardly in relation to said lower section while the grid is in the tray, said upper section including a longitudinal member having lateral fins projecting below the longitudinal member of said upper section and having slots extending upwardly from the bottom thereof to receive therein the longitudinal member of said bottom section, said longitudinal portion of the upper section cooperating with said lower section to divide the interior of the tray longitudinally.

6. A grid for ice cube trays, including a lower section adapted to form a longitudinal dividing member in a tray, an upper section including a longitudinal member having lateral fins and cooperating with said lower member to divide the interior of the tray into individual cube compartments, said fins projecting below the longitudinal member of the upper section and having slots extending upwardly from the bottom of the fins to receive therein the longitudinal member of the bottom section, both grid sections lying unattached in said tray, and lever means acting directly on said grid sections to cause a relative movement of said grid sections.

7. A grid for ice cube trays, including a lower section adapted to form a longitudinal vertically disposed dividing member in a tray, an upper section including a longitudinal dividing member having laterally extending fins, said fins extending below the bottom of said upper longitudinal member and having vertical slots to receive said bottom section therein, said grid sections being relatively movable to permit the cubes to be released therefrom.

8. A grid for ice cube trays, including a lower section adapted to form a longitudinal vertically disposed dividing member in a tray, a relatively movable upper section including a longitudinal member adapted to lie in a common plane with said lower member whereby said longitudinal members constitute a single vertical wall, and laterally extending fins connected to the longitudinal member of said upper grid section, said fins extending below the bottom of said upper longitudinal member.

9. A grid for ice cube trays including a lower section adapted to form a longitudinal dividing member in a tray, an upper section including a longitudinal member and associated lateral fins and cooperating with said lower member to divide the interior of the tray into individual cube compartments, said upper and lower sections being relatively movable within the tray, and lever means arranged to press downwardly on said lower grid section and upwardly on said upper grid section to cause a relative movement of said grid sections.

10. A grid for a freezing tray, comprising relatively movable upper and lower sections lying approximately in a common vertical plane and together forming a longitudinal division wall, a series of cross walls cooperating with said longitudinal wall to form two rows of ice block compartments, said cross walls being retained in place by said longitudinal wall and each being movable relative to at least one of said sections thereof, and force-multiplying means mutually reacting upon said upper and lower sections to force a relative movement therebetween and serving also to move each of said cross walls relative to at least one of said sections, to facilitate the removal of the frozen ice blocks.

11. A grid for a freezing tray, comprising relatively movable upper and lower sections lying approximately in a common vertical plane and together forming a central longitudinal division wall for the contents of the tray, a series of longitudinally spaced cross walls cooperating with said longitudinal wall to form two rows of ice block compartments, said cross walls each having a slot therein loosely receiving at least one of said sections in such manner that said cross walls are angularly movable relative to said loosely received section, and means mutually reacting upon said upper and lower sections to force a relative movement therebetween and serving also to force said cross walls to move angularly relative to said loosely received section.

12. A freezing tray having a pan and a removable grid for said pan, said grid comprising: relatively movable upper and lower sections lying approximately in a common vertical plane and together forming a single longitudinal division wall for the contents of said pan, a series of longitudinally spaced cross walls cooperating with said longitudinal wall to form ice block compartments on opposite sides thereof, said cross walls each having a slot therein loosely receiving said lower section in such manner that said cross walls are angularly movable relative to said lower section, and a lever operable to move said upper section relative to said lower section and to move said cross walls angularly relative to said lower section, to facilitate the removal of the ice blocks.

13. A grid for a freezing tray, comprising relatively movable upper and lower sections lying approximately in a common vertical plane and together forming a longitudinal division wall, a series of cross walls cooperating with said longitudinal wall to form two rows of ice block compartments, said cross walls being movable relative to said lower section, said lower section having an end portion projecting upwardly above the normal water level and lying adjacent an end portion of said upper section, and leverage means mutually reacting upon said two end portions and operable to move said upper section and said cross walls relative to said lower section.

14. A freezing tray having a pan and a removable grid for said pan, said grid comprising: relatively movable upper and lower sections lying approximately in a common vertical plane and together forming a single longitudinal division wall for the contents of said pan, a series of longitudinally spaced cross walls cooperating with said longitudinal wall to form ice block compartments on opposite sides thereof, said cross walls each having a slot therein loosely receiving said lower section in such manner that said cross walls are angularly movable relative to said lower section, said lower section having an end portion projecting upwardly above the normal water level and lying closely adjacent an end portion of said upper section, and leverage means mutually reacting upon said two end portions and operable to move said upper section relative to said lower section and to move said cross walls angularly relative to said lower section.

15. A grid for a freezing tray, comprising: a main longitudinal metal wall and a series of metal cross walls cooperating with said longitudinal wall to form two rows of ice block compartments, said cross walls each being individually carried by said longitudinal wall and each cross wall being movable relative to at least a portion of said longitudinal wall, and force-multiplying means mutually reacting between portions of said grid for moving said cross walls relative to at least a portion of said longitudinal wall to facilitate the removal of the ice blocks.

16. A grid for a freezing tray, comprising relatively movable upper and lower sections lying approximately in a common vertical plane and together forming a longitudinal division wall, a series of laterally extending fins associated with said longitudinal division wall and cooperating therewith to form two rows of ice block compartments, said fins being movable relative to said lower section, and force-multiplying means for moving said upper section and said fins relative to said lower section to facilitate the removal of the frozen ice blocks.

17. A grid for a freezing tray, comprising relatively movable upper and lower sections lying approximately in a common vertical plane and together forming a longitudinal division wall, a series of laterally extending fins each associated with both said upper and lower sections of said longitudinal wall and forming therewith two rows of ice block compartments, said fins being so associated with said upper section as to be movable by said upper section angularly relative to said lower section, and a force-multiplying lever mutually reacting between said upper and lower sections and operable to move said upper section and said fins relative to said lower section to facilitate the removal of the frozen ice blocks.

18. A freezing tray having a pan and a removable grid for said pan, said grid comprising: relatively movable upper and lower sections lying approximately in a comon vertical plane and together forming a single longitudinal division wall for the contents of said pan, a series of longitudinally spaced fins each extending laterally outwardly from both said upper and lower sections of said longitudinal wall and forming ice block compartments on opposite sides thereof, said fins being loosely associated with said lower section so as to be angularly movable relative thereto, and a lever operable to move said upper section relative to said lower section and operable to move said fins angularly relative to said lower section, to facilitate the removal of the frozen ice blocks.

19. In combination, a grid for a freezing tray, comprising: a main longitudinal partitioning wall and a series of longitudinally spaced metal cross walls cooperating with said main longitudinal wall to form two rows of ice block compartments, said cross walls each extending from side to side of said grid thru the plane of said main longitudinal wall and being carried by said main longitudinal wall, said cross walls being tiltable relative to at least a portion of said main longitudinal wall, and force-multiplying means adapted to mutually react between portions of said grid for tilting said cross walls relative to at least a portion of said main longitudinal wall to facilitate the removal of the ice blocks frozen within said compartments.

20. In combination, a grid for a freezing tray, comprising: a main longitudinal partitioning wall and a series of longitudinally spaced metal cross walls cooperating with said main longitudinal wall to form two rows of ice block compartments, said cross walls each extending from side to side of said grid thru the plane of said main longitudinal wall and being carried by said main longitudinal wall, said cross walls being tiltable relative to at least a portion of said main longitudinal wall, and a detached prying lever adapted to mutually react between portions of said grid for tilting said cross walls relative to at least a portion of said main longitudinal wall to facilitate the removal of the ice blocks frozen within said compartments.

21. In combination, a grid for a freezing tray, comprising: a main longitudinal partitioning wall and a series of longitudinally spaced metal cross walls cooperating with said main longitudinal wall to form two rows of ice block compartments, said cross walls each extending from side to side of said grid thru the plane of said main longitudinal wall and being individually mounted upon and retained in spaced relation by said main longitudinal wall, said cross walls being tiltable relative to at least a portion of said main longitudinal wall in the longitudinal direction of said main wall, and a detached prying tool adapted to mutually react between relatively movable portions of said grid and thereby tilt said cross walls relative to at least a portion of said main longitudinal wall in the longitudinal direction thereof whereby to facilitate the removal of the ice blocks frozen within said compartments.

22. In combination, an elongated freezing tray having a pan and a removable grid for said pan, said grid comprising: a longitudinal division wall and a series of longitudinally spaced cross walls cooperating therewith to form only two rows of ice block compartments, said cross walls extending from side to side of said grid thru the plane of said longitudinal wall and being carried by and retained in longitudinally spaced relation by said longitudinal wall in such manner that said cross walls are movable relative to a materially greater portion of said longitudinal wall which lies below the normal water level in said tray, and force multiplying means for mutually reacting between portions of said grid and independently of said pan for moving said cross walls relative to said pan and relative to said materially greater portion of said longitudinal wall to facilitate the removal of the ice blocks from said pan and grid.

23. In combination, an elongated freezing tray having a pan and a removable grid for said pan, said grid comprising: a longitudinal division wall and a series of longitudinally spaced cross walls cooperating therewith to form only two rows of ice block compartments, said cross walls extending from side to side of said grid thru the plane of said longitudinal wall and being carried by and retained in longitudinally spaced relation by said longitudinal wall in such manner that said cross walls are tiltable relative to a materially greater portion of said longitudinal wall which lies below the normal water level in said tray, and a detached prying lever for acting and reacting directly upon portions of said grid and independently of said pan for tilting said cross walls relatively to said pan and relative to said materially greater portion of said longitudinal wall to facilitate the removal of the ice blocks from said pan and grid.

24. In combination, a freezing device having a pan and a removable grid therein, said grid comprising an end wall member and two spaced side wall members providing a freezing cell within said pan, and leverage mechanism for positively tilting said side wall members relative to said pan and to said end wall member while said end wall member remains in its freezing position in said pan, to disrupt the cohesion of said members to the ice-block frozen within said cell.

25. In combination, a freezing device having a pan and a removable grid therein, said grid comprising an end wall member and two spaced side wall members providing a freezing cell within said pan, and force-multiplying mechanism for simultaneously positively tilting said side wall members relative to said pan while said end wall member remains in its freezing position in said pan, to facilitate the removal of the ice block frozen within said cell.

26. In combination, a freezing device having a pan and a removable grid therein, said grid comprising an end wall member and two spaced side wall members providing a freezing cell within said pan, and force-multiplying leverage mechanism for operatively engaging said side wall members and imparting ice-dislodging movement thereto relative to said end wall member while said end wall member remains in its freezing position in said pan, to facilitate the removal of the ice block frozen within said cell.

27. In combination: a metallic grid structure for disposition in a freezing tray and readily removable therefrom at will, said grid structure comprising a longitudinal wall member and a series of substantially non-flexible transverse wall members each extending continuously from one side of said grid structure to the other through the plane of said longitudinal wall member and being internested therewith to form a grid structure having a row of ice block compartments on each side of the longitudinal wall member, the longitudinal wall member and a plurality of said transverse members being mounted to permit relative movement between said longitudinal wall member and such plurality of transverse members, and force-multiplying means for imparting such relative movement to said wall members.

28. In combination: a metallic grid structure for disposition in a freezing tray and readily removable therefrom at will, said grid structure comprising a longitudinal wall member and a series of substantially non-flexible transverse wall members each extending continuously from one side of said grid structure to the other through the plane of said longitudinal wall member and being internested therewith to form a grid structure having a row of ice block compartments on each side of the longitudinal wall member, the longitudinal wall member and at least several of said transverse wall members being so mounted as to permit a relative tilting movement therebetween to thereby facilitate the removal of frozn ice blocks from said grid structure, and a force-multiplying hand lever for imparting such relative tilting movement.

29. In combination, a freezing device having a pan and a removable grid therein, said grid comprising a longitudinal partition composed of relatively movable upright portions disposed adjacent one another, and a series of single thickness substantially rigid fins extending laterally from the sides of said partition in spaced apart relation therealong, said fins each having a slot in the lower part thereof receiving at least a part of one of said portions of said longitudinal partition, whereby said fins cooperate with said partition to provide a plurality of ice-block forming compartments, and force multiplying means operable independent of contact with the tray and reacting between said portions of said longitudinal partition to move one portion relative to the other portion thereof, and thereby break the bond between the compartment walls and the ice blocks therein.

JULIUS ROBERTS.